(12) United States Patent
Keeley et al.

(10) Patent No.: US 6,901,951 B2
(45) Date of Patent: Jun. 7, 2005

(54) VALVE

(76) Inventors: Michael Leonard Patrick Keeley, 23 Hidcote Grove, Marston Green, Birmingham, B37 7BE (GB); Leslie Burgin, 46 Jillcot Road, Solihull, West Midlands, B92 8JG (GB)

(*) Notice: Subject to any disclaimer, the term of this patent is extended or adjusted under 35 U.S.C. 154(b) by 0 days.

(21) Appl. No.: 10/181,366

(22) PCT Filed: Jan. 17, 2001

(86) PCT No.: PCT/GB01/00165

§ 371 (c)(1),
(2), (4) Date: Jul. 17, 2002

(87) PCT Pub. No.: WO01/53615

PCT Pub. Date: Jul. 26, 2001

(65) Prior Publication Data

US 2003/0000576 A1 Jan. 2, 2003

(30) Foreign Application Priority Data

Jan. 17, 2000 (GB) ............................... 0000991

(51) Int. Cl.⁷ ........................ F16K 31/34; F16K 33/00
(52) U.S. Cl. ...................................... 137/414; 137/443
(58) Field of Search .......................... 137/413, 414, 137/426, 442, 445, 444

(56) References Cited

U.S. PATENT DOCUMENTS

| | | | | |
|---|---|---|---|---|
| 209,867 A | * | 11/1878 | Craigie | 137/414 |
| 1,302,538 A | * | 5/1919 | Gulick | 137/413 |
| 2,599,498 A | * | 6/1952 | Suska | 137/414 |
| 2,799,290 A | * | 7/1957 | Svirsky | 137/414 |
| 2,854,994 A | * | 10/1958 | Glasgow | 137/414 |
| 3,255,773 A | * | 6/1966 | McQueen | 137/414 |
| 3,402,732 A | * | 9/1968 | Hardison | 137/414 |
| 3,763,881 A | | 10/1973 | Jones | |
| 4,072,164 A | * | 2/1978 | Kaden | 137/414 |
| 4,376,523 A | | 3/1983 | Goyen | |
| 4,399,835 A | * | 8/1983 | Holderith | 137/414 |
| 4,566,484 A | | 1/1986 | Silverman | |
| 4,903,724 A | * | 2/1990 | Simard | 137/414 |
| 4,944,326 A | * | 7/1990 | Hsieh | 137/414 |
| 5,638,859 A | * | 6/1997 | Thomson et al. | 137/414 |
| 5,738,141 A | | 4/1998 | Blanke et al. | |
| 5,836,346 A | | 11/1998 | Nichols-Roy | |

FOREIGN PATENT DOCUMENTS

| | | |
|---|---|---|
| EP | 0 084 082 A2 | 7/1983 |
| FR | 2 724 958 A1 | 3/1996 |
| GB | 1 172 961 A | 12/1969 |
| GB | 1 435 710 A | 5/1976 |
| GB | 1 540 082 A | 7/1979 |
| GB | 2 242 503 B | 2/1994 |
| GB | 2 258 920 B | 2/1995 |
| GB | 2 280 033 B | 11/1996 |
| WO | WO-95/05508 A1 | 2/1995 |

* cited by examiner

Primary Examiner—George L. Walton
(74) Attorney, Agent, or Firm—Akerman Senterfitt

(57) ABSTRACT

A valve (19) primarily designed as a float valve to control the flow of water under pressure into a cistern has an upstream chamber (22) and a downstream chamber (23). The upstream chamber (22) communicates an inlet (21) for mains water supply with outlets (17, 17A) and the downstream chamber (23) has an outlet (24) which is closed by a valve (25) when a float rises a float rod (14). A primary valve member assembly comprises a piston (3) to the downstream end of which a diaphragm (5) is attached. When the secondary valve (25) is closed pressure on diaphragm (5) causes piston (3) to close the inlet (21). When the secondary valve (25) is opened by the rising float the piston (3) is expelled from the inlet (21) allowing water to flow into the cistern through the upstream chamber (22).

37 Claims, 3 Drawing Sheets

Figure 1:
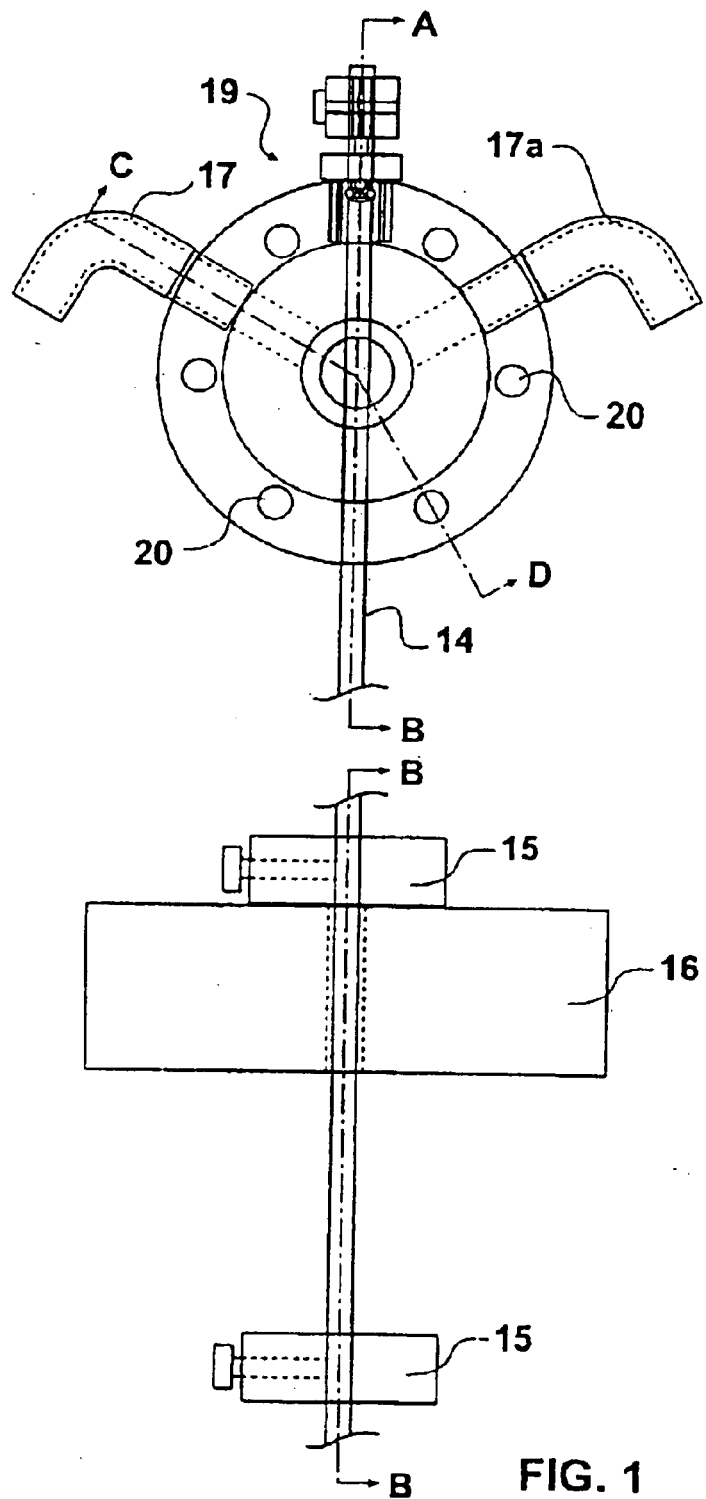

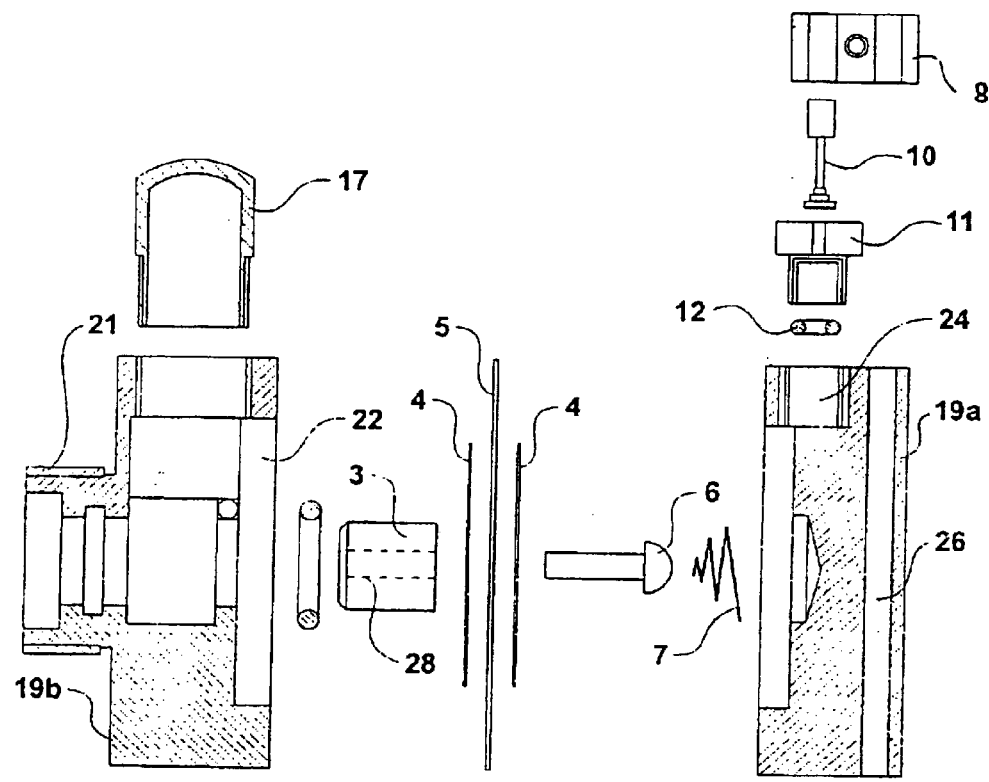
FIG. 4    FIG. 3
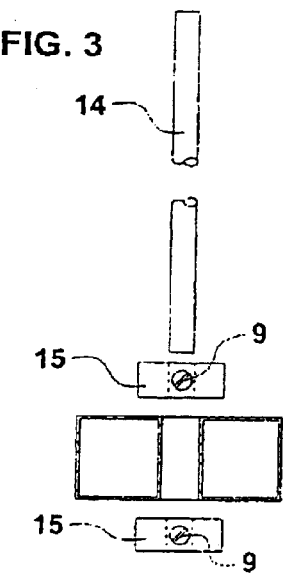

VALVE

This invention relates to an improved valve for controlling the flow of a pressurised fluid which is particularly, although not exclusively, suitable for controlling the flow of water into a storage cistern such as used in domestic and industrial water supply and sanitation systems.

The use of float valves for such purposes are well known but suffer a number of disadvantages such as erratic performance and failure fully to close of a valve which is urged to the valve-closed position as a float rises in a cistern due to clogging, the accretion of mineral deposits and the deterioration of sealing elements. Generally the action of such valves is not positive and they tend to remain in a partly open condition longer than is desirable as a float rises. Conventional float valves are also costly to manufacture and consequently to install.

A principal object of the present invention is to improve upon known float valves both in terms of their cost and operation. In particular the present invention aims to provide a float valve the operation of which will be positive and as near instantaneous as possible, avoiding undesirable "trickle" when water in the cistern has reached the desired level. Another object of the invention is to provide a float valve which is "fail safe" in that the assembly will normally close the water supply until opened by the descent of the float, in contrast to conventional arrangements in which the valve is biassed to the open position and closed only when the float rises.

In accordance with the present invention there is provided a valve for controlling flow of a pressurised fluid, the valve comprising an upstream chamber having an inlet and an outlet, the inlet being communicable with a source of fluid under pressure, a downstream chamber in communication with the upstream chamber and having an outlet, a primary valve member which is movable between positions closing and opening communication between the inlet and outlet of the upstream chamber and a secondary valve member which is movable between positions closing and opening the upstream chamber, the primary valve member having associated therewith upstream and downstream control surfaces of unequal cross sectional area of which the control surface of greater cross sectional area is exposed to the downstream chamber and the arrangement being such that when the secondary valve member opens the outlet of the downstream chamber the primary valve member is urged to its open position by fluid pressure on the control surface of lesser cross sectional area thereby communicating the inlet of the upstream chamber with the outlet thereof.

The secondary valve member may be a float valve adapted to control flow of water into a cistern, wherein the outlet of the upstream chamber opens vertically and the secondary valve member is movable up and down by a rod to which a float is attached, the secondary valve member opening and closing the outlet of the upstream chamber according to the level of water in the cistern.

The said rod may be raised by the float to close the secondary valve member when water in the cistern rises to, a predetermined level or lowered by the weight of the float to open the secondary valve member when water in the cistern falls below a predetermined level.

The rod is preferably generally vertical in use and preferably has stops along its length between which the float is movable.

The primary valve member may be a piston reciprocable in a bore which connects the upstream and downstream chambers and may be attached to a diaphragm spanning the upstream side of the downstream chamber and constituting said control surface of greater cross sectional area.

The diaphragm is preferably sandwiched between support plates which, together with the diaphragm, are secured to the downstream end of the piston by a screw formed with a coaxial bore, the screw engaging in a coaxial bore of the piston thereby communicating the upstream and downstream chambers of the valve.

A compression spring may be provided which acts between the downstream side of the downstream chamber and the diaphragm to bias the piston to the valve-closed position of the primary valve member.

Figure 2:
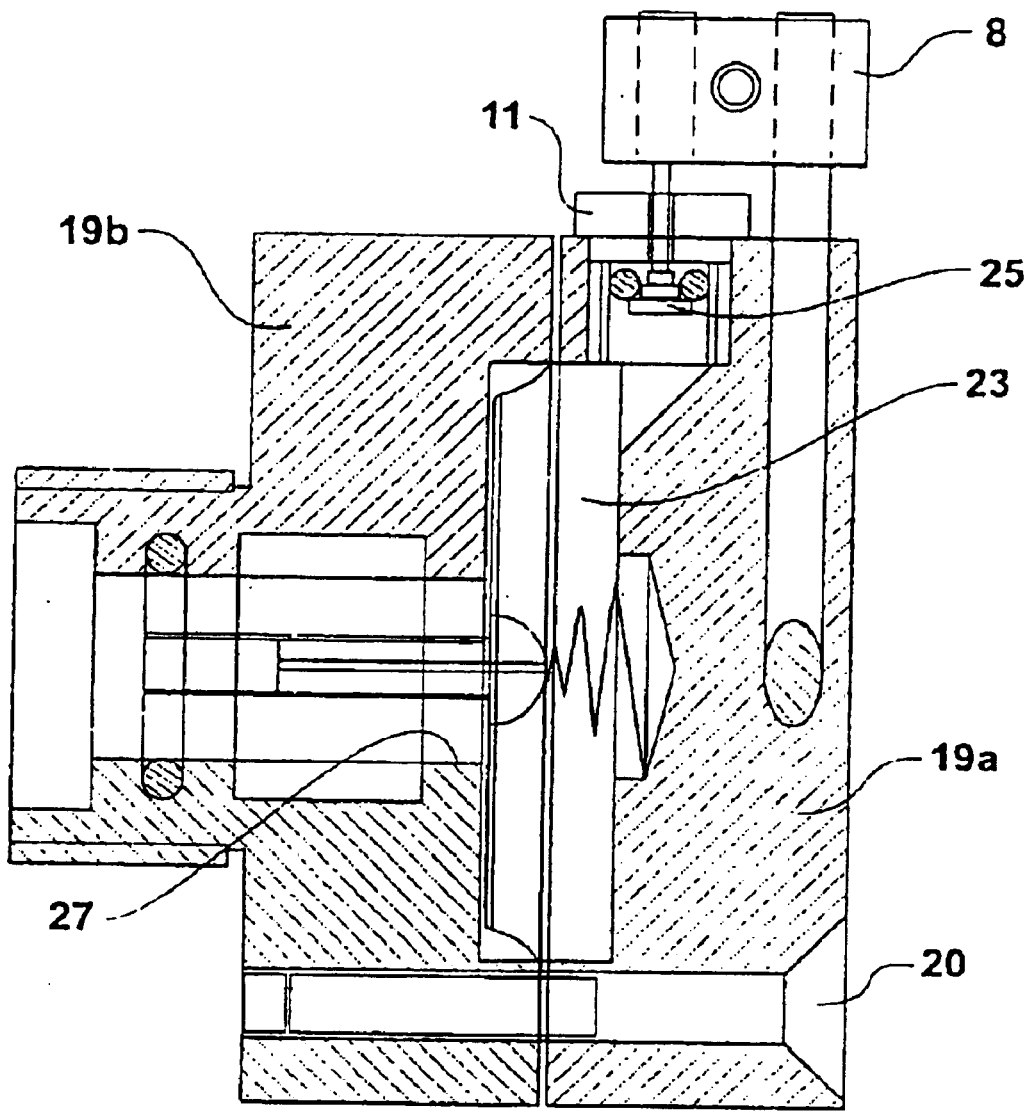

A preferred embodiment of the present invention will now be described by way of non-limitative example with reference to the accompanying drawings, in which:

FIG. 1 is a front elevation of a float valve in accordance with the present invention, FIG. 2 is a cross sectional view taken on the line A-D of FIG. 1, FIG. 3 is an exploded cross sectional view taken on the line B—B of FIG. 1, and FIG. 4 is an exploded cross sectional view taken on the line B-C of FIG. 1.

A valve body 19 comprises components 19A and 19B held together by a circumferential array of screws 20. The component 19B has a coaxial inlet connection 21 for connection to a source of water under pressure (not shown) and within the component 19B is an upstream chamber 22 in communication with two outlet spouts 17 and 17A. Within the component 19A is a downstream chamber 23 which has a vertical outlet opening 24. A hollow relief body 11 is screwed into the outlet opening 24 to provide a seat for a secondary valve 25 with the interposition of an O-ring 12. The secondary valve 25 is connected by a stem 10 to a clamping block 8 which is also secured to the upper end of a float rod 14 which is movable vertically in a bore 26 in the back of the valve body portion 19A. At a position below the valve body 19 the float rod 14 has stops 15 adjustably secured to it by screws 9 and between these stops 15 a float body 16 is movable along the float rod 14.

Within the valve body 19 is a coaxial bore 27 connecting the upstream chamber 22 with the downstream chamber 23 and aligned with the inlet 21. A primary valve member in the form of a piston 3 is reciprocable in the bore 27 between positions in which its upstream end closes the inlet 21 (FIG. 2) and in which it withdraws toward the upstream chamber 23, thus opening communication between the inlet 21 and the outlet spouts 17 and 17A through the upstream chamber 22.

A diaphragm 5 is trapped between the components 19A and 19B of the valve body and spans the upstream side of the downstream chamber 23. The diaphragm 5 is sandwiched between support plates 4 which are clamped to the upstream end of the piston 3 by an equalisation screw 6, which makes a screw threaded connection with the upstream end of a coaxial bore 28 through the piston 3. The screw 6 also has a coaxial bore and by this means the downstream chamber 23 of the valve is constantly in communication with the inlet 21 whatever the position of the piston 3. A compression spring 7 biasses the assembly of diaphragm 5, support plates 4, screw 6 and piston 3 toward the valve-closed position of the latter, in which the upstream end of the piston 3 shuts off communication between the inlet 21 and the spouts 17 and 17A.

In use the valve 19 is mounted in a cistern (not shown) with the float rod 14 depending vertically into the cistern. The stops 15 are adjusted along the length of the float rod to determine at what water levels within the cistern the valve 19 will operate.

Assuming that the cistern is at first empty the weight of the float 16 and float rod 14 will hold the valve 25 open. Water is free to flow through the secondary valve opening 24 so that water pressure acting on the upstream end of piston 3 will displace the latter to the valve-open position in which water can flow from the inlet 21 through both spouts 17, 17A to fill the cistern.

When the water level in the cistern has risen sufficiently to cause the float 16 to lift the upper stop 15, and with it the float rod 14, the secondary valve 25 will be seated, closing the outlet 24 of the downstream chamber. Pressure in downstream chamber 23 will therefore rise until it equals pressure in inlet 21, but because the cross sectional area of the diaphragm 5 is substantially greater than the cross sectional area of the upstream end of piston 3 the latter will be urged to the valve-closed position in which it shuts off communication between inlet 21 and the spouts 17,17A. This position will be maintained until a drop in the water level in the cistern causes the float 16 once again to unseat the secondary valve 25, whereupon the primary valve 3 will re-open.

It will be apparent that many modifications of the above described embodiment are possible. Features which have been described and illustrated because they are currently considered desirable are not essential, such as the provision of the spring 7, two spouts 17,17A and the adjustable stops 15 on the float rod. The spring 7 may be dispensed with and the upstream chamber 22 may have one outlet or more than two outlets. The float may be rigidly fixed to the float rod. It is not essential that the float rod should be vertical. It might have a hinged connection to the valve body 19 and extend therefrom at an angle to the vertical, being pivotally connected to the stem 10 of the secondary valve 25. Clearly the valve body 19 could be of a different construction.

Neither is the provision of a diaphragm such as 5 considered to be essential. All that is necessary is that the cross sectional area of the primary valve member presented to the upstream chamber is greater than that presented to the inlet.

Although designed as a float valve for use in controlling the water level in a cistern the valve of the invention is considered to have utility in controlling the flow of any pressurised fluid, such as a gas, in conditions in which it is appropriate to rely upon incoming pressure to maintain the primary valve member in the valve-closed position.

What is claimed is:

1. A float valve for controlling flow of a pressurized fluid, the valve comprising:
   an upstream chamber having an inlet and an outlet, the inlet being communicable with a source of fluid under pressure;
   a downstream chamber in communication with the upstream chamber and having an outlet;
   a primary valve member which is movable between positions closing and opening communication between the inlet and outlet of the upstream chamber; and
   a secondary valve member which is movable between positions closing and opening the upstream chamber;
   wherein the primary valve member has associated therewith upstream and downstream control surfaces of unequal cross sectional area of which the control surface of greater cross sectional area is exposed to the downstream chamber such that when the secondary valve member opens the outlet of the downstream chamber the primary valve member is urged to its open position by fluid pressure on the control surface of lesser cross sectional area thereby communicating the inlet of the upstream chamber with the outlet thereof, the secondary valve member being a non-return valve biased towards the closed position by the pressure of the pressurized fluid;
   wherein the primary valve member is a piston reciprocal in a bore which connects the upstream and downstream chambers and is attached to a diaphragm, spanning the upstream side of the downstream chamber, with a screw formed with a coaxial bore, the screw engaging in the coaxial bore of the piston thereby communicating the upstream and downstream chambers of the valve.

2. A valve as claimed in claim 1, adapted to control flow of water into a cistern, wherein the outlet of the upstream chamber opens vertically and the secondary valve member is movable up and down by a float rod to which a float is attached, the secondary valve member opening and closing the outlet of the upstream chamber according to the level of water in the cistern.

3. A valve as claimed in claim 2, wherein the said float rod can be raised by the float to close the secondary valve member when water in the cistern rises to a predetermined level or lowered by the weight of the float to open the secondary valve member when water in the cistern falls below a predetermined level.

4. A valve as claimed in claim 1, wherein the secondary valve member is movable up and down by a float rod, to which a float is attached and wherein the float rod is generally vertical in use and has stops along its length between which the float is movable.

5. A valve as claimed in claim 1, wherein the diaphragm comprises said control surface of greater cross sectional area.

6. A valve as claimed in claim 5, wherein the diaphragm is sandwiched between support plates which, together with the diaphragm, are secured to the downstream end of the piston by the screw.

7. A valve as claimed in claim 6, wherein a compression spring acts between the downstream side of the downstream chamber and the diaphragm to bias the piston to the valve-closed position of the primary valve member.

8. A valve for controlling the flow of a pressurized fluid as claimed in claim 1 wherein the secondary valve member is integral with a float rod, moveable in the direction of its longitudinal axis.

9. A valve for controlling flow of a pressurized fluid, the valve comprising:
   an upstream chamber having an inlet and an outlet, the inlet being communicable with a source of fluid under pressure,
   a downstream chamber in communication with the upstream chamber and having an outlet,
   a primary valve member which is movable between positions closing and opening communication between the inlet and outlet of the upstream chamber and
   a secondary valve member which is movable between positions closing and opening the upstream chamber,
   the primary valve member having associated therewith upstream and downstream control surfaces of unequal cross sectional area of which the control surface of greater cross sectional area is exposed to the downstream chamber and the arrangement being such that when the secondary valve member opens the outlet of the downstream chamber the primary valve member is urged to its open position by fluid pressure on the control surface of lesser cross sectional area thereby communicating the inlet of the upstream chamber with the outlet thereof, the secondary valve member being a non-return valve biased towards the closed position by the pressure of the pressurized fluid;

wherein the primary valve member is a piston reciprocable in a bore which connects the upstream and downstream chambers and is attached to a diaphragm spanning the upstream side of the downstream chamber and constituting said control surface of greater cross sectional area;

wherein the diaphragm is sandwiched between support plates which, together with the diaphragm, are secured to the downstream end of the piston by a screw formed with a coaxial bore, the screw engaging in a coaxial bore of the piston thereby communicating the upstream and downstream chambers of the valve.

10. A valve as claimed in claim 1, wherein a compression spring acts between the downstream side of the downstream chamber and the diaphragm to bias the piston to the valve-closed position of the primary valve member.

11. A valve as claimed in claim 9, wherein a compression spring acts between the downstream side of the downstream chamber and the diaphragm to bias the piston to the valve-closed position of the primary valve member.

12. A float valve for controlling flow of a pressurized fluid, the valve comprising:

an upstream chamber having an inlet and an outlet, the inlet being communicable with a source of fluid under pressure;

a downstream chamber in communication with the upstream chamber and having an outlet;

a primary valve member which is movable between positions closing and opening communication between the inlet and outlet of the upstream chamber; and a secondary valve member which is movable between positions closing and opening the upstream chamber, wherein the primary valve member has associated therewith upstream and downstream control surfaces of unequal cross sectional area of which the control surface of greater cross sectional area is exposed to the downstream chamber such that when the secondary valve member opens the outlet of the downstream chamber the primary valve member is urged to its open position by fluid pressure on the control surface of lesser cross sectional area thereby communicating the inlet of the upstream chamber with the outlet thereof, the secondary valve member being moveable linearly by a float rod moving in the direction of its longitudinal axis, wherein the primary valve member is a piston reciprocal in a bore which connects the upstream and downstream chambers and is attached to a diaphragm, spanning the upstream side of the downstream chamber, with a screw formed with a coaxial bore, the screw engaging in the coaxial bore of the piston thereby communicating the upstream and downstream chambers of the valve.

13. A valve as claimed in claim 12, adapted to control flow of water into a cistern, wherein the outlet of the upstream chamber opens vertically and the secondary valve member is movable up and down by the float rod to which a float is attached, the secondary valve member opening and closing the outlet of the upstream chamber according to the level of water in the cistern.

14. A valve as claimed in claim 13, wherein the said float rod can be raised by the float to close the secondary valve member when water in the cistern rises to a predetermined level or lowered by the weight of the float to open the secondary valve member when water in the cistern falls below a predetermined level.

15. A valve as claimed in claim 12, wherein the float rod is generally vertical in use and has stops along its length between which the float is movable.

16. A valve as claimed in claim 12, wherein the diaphragm comprises said control surface of greater cross sectional area.

17. A valve as claimed in claim 16, wherein the diaphragm is sandwiched between support plates which, together with the diaphragm, are secured to the downstream end of the piston by the screw.

18. A valve as claimed in claim 16, wherein a compression spring acts between the downstream side of the downstream chamber and the diaphragm to bias the piston to the valve-closed position of the primary valve member.

19. A valve as claimed in claim 12, wherein a compression spring acts between the downstream side of the downstream chamber and the diaphragm to bias the piston to the valve-closed position of the primary valve member.

20. A valve as claimed in claim 12, wherein the secondary valve member is integral with the float rod.

21. A float valve for controlling flow of a pressurized fluid, the valve comprising:

an upstream chamber having an inlet and an outlet, the inlet being communicable with a source of fluid under pressure;

a downstream chamber in communication with the upstream chamber and having an outlet;

a primary valve member which is movable between positions closing and opening communication between the inlet and outlet of the upstream chamber;

and a secondary valve member which is movable between positions closing and opening the upstream chamber, wherein the primary valve member has associated therewith upstream and downstream control surfaces of unequal cross sectional area of which the control surface of greater cross sectional area is exposed to the downstream chamber such that when the secondary valve member opens the outlet of the downstream chamber the primary valve member is urged to its open position by fluid pressure on the control surface of lesser cross sectional area thereby communicating the inlet of the upstream chamber with the outlet thereof, the primary valve member being substantially orthogonal to the secondary valve member, the latter being substantially upright in its normal attitude of operation;

wherein the secondary valve member is lifted to the closed position by the float as the float rises and which is unseated to the open position as the float drops, the arrangement being such that pressurized fluid in the downstream chamber will resist the unseating of the secondary valve member until the weight of the float is sufficient to overcome fluid pressure wherein the primary valve member is a piston reciprocal in a bore which connects the upstream and downstream chambers and is attached to a diaphragm, spanning the upstream side of the downstream chamber, with a screw formed with a coaxial bore, the screw engaging in the coaxial bore of the piston thereby communicating the upstream and downstream chambers of the valve.

22. A valve as claimed in claim 21, adapted to control flow of water into a cistern, wherein the outlet of the upstream chamber opens vertically and the secondary valve member is movable up and down by a float rod to which a float is attached, the secondary valve member opening and closing the outlet of the upstream chamber according to the level of water in the cistern.

23. A valve as claimed in claim 22, wherein the said float rod can be raised by the float to close the secondary valve member when water in the cistern rises to a predetermined level or lowered by the weight of the float to open the secondary valve member when water in the cistern falls below a predetermined level.

24. A valve as claimed in claim 21, wherein the secondary valve member is movable up and down by a float rod and wherein the float rod is generally vertical in use and has stops along its length between which the float is movable.

25. A valve as claimed in claim 21, wherein the diaphragm constitutes said control surface of greater cross sectional area.

26. A valve as claimed in claim 25, wherein the diaphragm is sandwiched between support plates which, together with the diaphragm, are secured to the downstream end of the piston by the screw.

27. A valve as claimed in claim 21, wherein a compression spring acts between the downstream side of the downstream chamber and the diaphragm to bias the piston to the valve-closed position of the primary valve member.

28. A valve as claimed in claim 26, wherein a compression spring acts between the downstream side of the downstream chamber and the diaphragm to bias the piston to the valve-closed position of the primary valve member.

29. A valve as claimed in claim 21, wherein the secondary valve member is moveable by a float rod and wherein the secondary valve member is movable in the same direction as the float rod.

30. A valve as claimed in claim 21, wherein the secondary valve member is integral with a float rod.

31. A float valve for controlling flow of pressurized water from an inlet pipe into a tank, the valve comprising:
   an upstream chamber having an inlet and a first outlet, the inlet being communicable with said inlet pipe;
   a downstream chamber in communication with the upstream chamber and having a second, vertically opening outlet;
   a primary valve member which is movable between positions closing and opening communication between the inlet and first outlet of the upstream chamber;
   a secondary valve member vertically movable in the downstream chamber; and
   a float rod vertically movable by a float as the water level in the tank varies to lift the secondary valve member to the closed position when water in the tank has risen to a predetermined level and to pull the secondary valve member downward to an open position when water in the tank has dropped to a predetermined level;
   the primary valve member having associated therewith upstream and downstream control surfaces of unequal cross sectional area of which the control surface of greater cross sectional area is exposed to the downstream chamber such that when the secondary valve member opens the second outlet of the downstream chamber the primary valve member is urged to its open position by water pressure on the control surface of lesser cross sectional area thereby communicating the inlet of the upstream chamber with the first outlet thereof, the arrangement being such that pressurized water in the downstream chamber will resist the unseating of the secondary valve member until the weight of the float is sufficient to overcome it and such that closure of the secondary valve member is effected when the float has sufficient buoyancy to lift it.

32. A valve as claimed in claim 31, adapted to control flow of water into a tank, wherein the first outlet of the upstream chamber opens vertically and the secondary valve member is movable up and down by the float rod to which the float is attached, the secondary valve member opening and closing the first outlet of the upstream chamber according to the level of water in the cistern.

33. A valve as claimed in claim 31, wherein the secondary valve member is movable up and down by the float rod, to which the float is attached and wherein the float rod is generally vertical in use and has stops along its length between which the float is movable.

34. A valve as claimed in claim 31, wherein the primary valve member is a piston reciprocable in a bore which connects the upstream and downstream chambers and is attached to a diaphragm spanning the upstream side of the downstream chamber and constituting said control surface of greater cross sectional area.

35. A valve as claimed in claim 34, wherein the diaphragm is sandwiched between support plates which, together with the diaphragm, are secured to the downstream end of the piston by a screw formed with a coaxial bore, the screw engaging in a coaxial bore of the piston thereby communicating the upstream and downstream chambers of the valve.

36. A valve as claimed in claim 34, wherein a compression spring acts between the downstream side of the downstream chamber and the diaphragm to bias the piston to the valve-closed position of the primary valve member.

37. A valve as claimed in claim 31, wherein the secondary valve member is integral with the float rod, moveable in the direction of its longitudinal axis.

* * * * *